Patented Aug. 6, 1929.

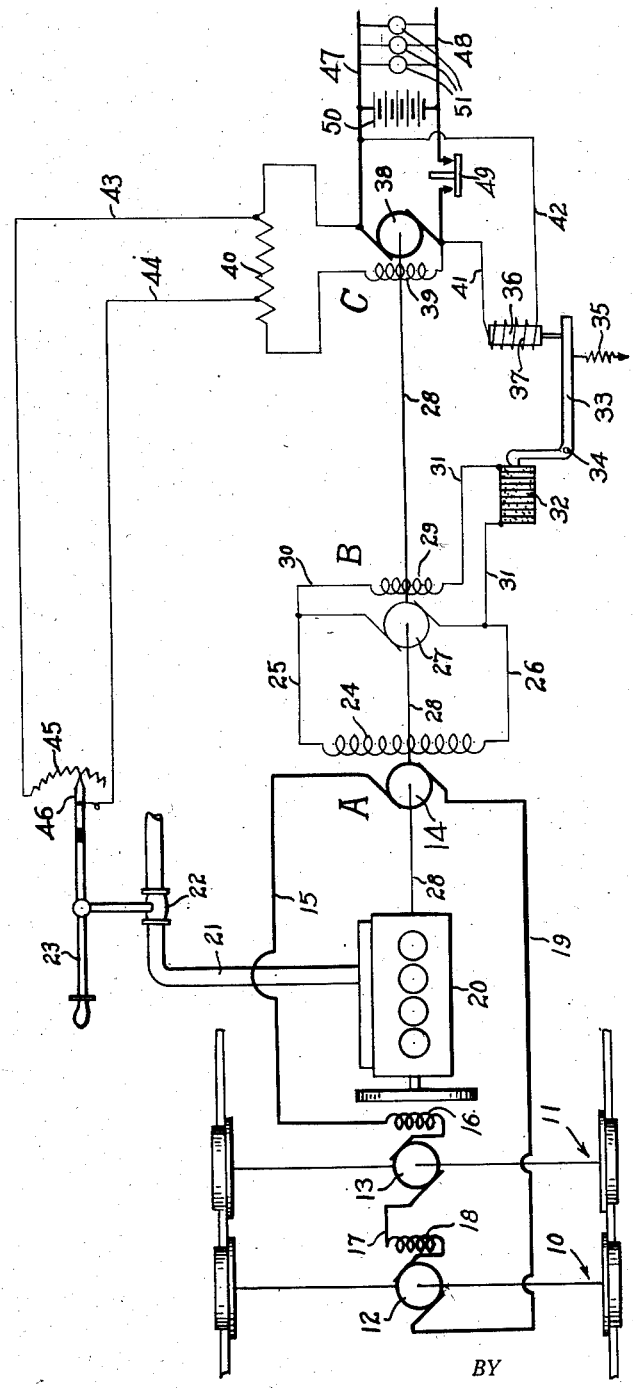

1,723,284

UNITED STATES PATENT OFFICE.

ALAN VARLEY LIVINGSTON, OF NEW HAVEN, CONNECTICUT, ASSIGNOR TO THE SAFETY CAR HEATING & LIGHTING COMPANY, A CORPORATION OF NEW JERSEY.

VEHICLE DRIVING APPARATUS AND SYSTEM.

Application filed April 15, 1925. Serial No. 23,212.

This invention relates to power transmissions and more particularly to the transmission of power from a prime mover to the driving wheels or axles of a vehicle, such as a locomotive, for example.

One of the objects of this invention is to provide a simple and practical apparatus for transmitting power from a prime mover to a load in a manner capable of achieving not only great reliability of operation, but also high efficiency of action. Another object is to provide a power transmission of the above-mentioned nature which will be capable of maintaining a high efficiency of operation, irrespective of the widely varying conditions of practical use, such as wide variations in speed or magnitude of the load to be driven. Another object of this invention is to provide a system and apparatus for transmitting power to the driving wheels or axles of a vehicle in which may be embodied not only simplicity of control, but also a ready adaptability of the apparatus and system to meet efficiently and successfully the peculiarly variable energy requirements of traction apparatus. This invention aims also to provide an electrical system and apparatus of the above-mentioned nature, which will be capable of achieving high efficiency and dependable operation and which, moreover, will be capable of embodiment in practice in a form at once rugged and durable and of wide range of action. Another object is to provide an apparatus and system of the above-mentioned nature well adapted to meet the hard and varying conditions of practical use. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

Certain features of the invention disclosed herein are broadly disclosed in, and broadly claimed in the claims of, my co-pending applications Serial No. 22377, filed April 11, 1925, and Serial No. 22378, filed April 11, 1925.

In the single figure of the accompanying drawing, there is shown diagrammatically the apparatus and circuit arrangements illustrating one of various possible embodiments of this invention.

As conducive to a clearer understanding of certain features of this invention, it may at this point be noted that, for heavy traction service, many very desirable advantages reside in the use of a prime mover, such as an internal combustion engine, which may be operated by a suitable fuel such as gas or oil, for example; but the achievement of such advantages, because of economic conditions and the variability in character of the load to be imposed upon a prime mover of such a character, is accompanied by a number of difficulties, not the least of which is the maintenance of a high degree of efficiency of operation in the internal combustion engine. It is accordingly one of the chief aims of this invention to provide a system and apparatus capable of maintaining such a high degree of efficiency of operation throughout the widely changing characteristics of the load on the system that such advantages as those noted above may be dependably and consistently realized.

Turning now to the drawing, there are indicated at 10 and 11 respectively two pairs of wheels and associated axles constituting part of the vehicle to be driven, remaining portions of the vehicle being omitted from the drawing for the sake of greater simplicity of illustration. Connected in any suitable manner to the wheels or axles 10 and 11 are the driving motors 12 and 13 respectively, two motors being shown in the drawing merely by way of illustration. The motors 12 and 13 may be of any suitable or appropriate form and may, for example, take the form of the usual type of series traction motor. The motors 12 and 13 are supplied with energy from a main generator A, the armature of which is indicated at 14 and the output terminals of which may be connected to the motors 12 and 13 in any suitable manner, and through any appropriate form of switching or control devices, if desired. For the sake of greater simplicity of illustration, the latter devices are omitted from the drawing.

The motors 12 and 13, also, may be connected with respect to the generator A in any appropriate relation, and in the drawing are illustratively shown as being connected in series. Thus, the circuit of these motors may, when the latter are placed in operation, be as follows:—From one terminal of the generator A, conductor 15, series field 16 of motor 13, thence through the armature of the latter, conductor 17 through the field 18 of the motor 12, thence through the armature of the latter and by way of conductor 19 back to the other terminal of the generator A.

The armature 14 of the main generator A is adapted to be driven in any suitable manner by an appropriate prime mover, the latter being shown diagrammatically at 20 in the form of an internal combustion engine of appropriate form. The engine 20 may be supplied with fuel in appropriate form and from any suitable source through a conduit diagrammatically indicated at 21, and any suitable means may be provided for controlling at will the fuel supplied to the prime mover 20 and thus to control the output of the latter. By way of illustration, there is diagrammatically indicated at 22 a valve in the conduit 21, the valve 22 being provided with a handle 23 to permit manual control of the engine 20 and hence of the operation of the load or the vehicle being driven.

The main generator A is provided with a main field winding 24, preferably separately excited; I have therefore provided an exciter generator B having its output terminals connected, as by conductors 25 and 26, directly to the field winding 24 of the main generator A, thus to supply the field 24 with exciting current. The exciter generator B is preferably driven by the prime mover or engine 20, and by way of illustration the armature 27 of the exciter generator B, as well as the armature 14 of the main generator A, may be directly connected to the shaft 28 of the prime mover 20, as is diagrammatically illustrated in the drawing.

The exciter generator B is of any appropriate form and preferably takes the form of a shunt wound generator. It is hence provided with a shunt field 29 having its one terminal connected to one terminal of the armature 27 of the exciter B, as by the conductor 30, and having its other terminal connected by conductor 31 to the other terminal of the exciter generator B; in the conduit 31 I have interposed a variable resistance, taking the form preferably of a carbon pile 32, so that the excitation of the exciter generator B may be dependably controlled and the output of the exciter (and hence the excitation supplied to the field winding 24 of the main generator A) controlled throughout wide ranges. Operative upon the free or unanchored end of the carbon pile 32 is one arm of a bell crank lever 33, pivoted as at 34, and to the other arm of which is connected a spring 35 arranged to act upon the lever 33 in such a direction as to relieve the pressure on the carbon pile. Acting in opposition to the spring 35 is a core 36 of a solenoid, the winding 37 of which, when appropriately energized, may bring about, in conjunction with the action of the spring 35 the control of the pressure upon the carbon pile 32, and hence the control of the resistance of the latter.

Suitably driven by the prime mover or internal combustion engine 20, as by the direct connection of its armature 38 to the prime mover shaft 28, for example, is an auxiliary control or regulator generator C; the latter may be of any appropriate form, and preferably is of the shunt wound type. It is therefore provided with a shunt field 39 bridged across the terminals of the armature 38, but through a resistance 40 arranged in series therewith. Conductors 41 and 42 connect the winding 37 of the solenoid 36—37 directly across the terminals of the armature 38 of the regulator generator C. The latter is preferably so constructed, with respect to the portion of its saturation curve throughout which portion it is to operate that the voltage produced by the generator C will be relatively sensitive to changes in speed of the armature 38 thereof, and hence the changes in speed of the prime mover or internal combustion engine 20. Any suitable means may be provided for changing the value of the resistance 40 in circuit with the shunt field 39 of the generator C, in order thereby to change the standard of operation of the generator C, and by way of illustration I have utilized conductors 43 and 44 to connect in shunt with the resistance 40 a variable resistance comprising a resistance element 45 and a coacting contact member 46, the latter being connected to the throttle or valve-operating handle 23 so that a movement of the latter will change the valve of the resistance 45 shunted about the resistance 40.

The exciter generator B may be made of sufficient capacity to provide for the maximum demand made upon it to supply excitation current to the field 24 of the main generator A; the auxiliary generator C I prefer to make of sufficient capacity to supply energy to various translating devices. For example, I have shown an auxiliary power circuit 47—48, connected to the generator C through any suitable form of automatic switch generally indicated at 49, and to this power circuit 47—48 may be connected the translating devices which may take the form, for example, of a series of lamps 50 to serve as a source of illumination for the vehicle or the train drawn thereby. The automatic switch 49 is of such a character that it will effect a connection and disconnection of the circuit 47—48 to or from the generator C depending upon the activity or inactivity of the latter, and if desired, I may include in the circuit 47—48 a storage battery 51 adapted to be charged by the generator C when the latter is active and to supply energy to the translating devices connected to the circuit 47—48 when the generator C is inactive.

The solenoid 36—37 is preferably so constructed that, throughout the range of movement of the core 36, equilibrium will be established as soon as a predetermined voltage is impressed upon the coil 37 of the solenoid.

Considering now the operation of the apparatus and system hereinbefore described, it may first of all be noted that the prime mover 20, taking the form preferably of an internal combustion engine, has a certain power output-speed characteristic at which the desired or intended efficiency is achieved, and which characteristic it is highly desirable in practice to realize and to maintain throughout the widely varying changes which may take place in the load. Assuming first that the load on the motors 12 and 13 is substantially constant, there will be a certain desired speed of operation of the engine 20 which, for this load, will give the engine 20 the intended degree of efficiency. Assuming that this condition of constancy of load on the motors 12—13 and hence upon the generator A is continued, the intended speed of operation of the engine 20 for this load will be automatically maintained by the apparatus and system provided by this invention. The exciter generator B will supply the field 24 of the main generator A with sufficient excitation current to cause the generator A to have an output sufficient to carry the assumed load; but the control of the excitation supplied the generator A is under the control of the auxiliary generator C. Assuming that such conditions arise as to tend to decrease the speed of the engine 20 and hence to diminish its efficiency and operation, the decrease in speed of the engine 20 will cause a decrease in the voltage produced by the generator C, the latter, as above noted, being relatively sensitive to speed changes. The energization of the winding 37 of the solenoid 36—37 is thus diminished, the spring 35 is thus permitted to increase the resistance of the carbon pile 32, and the increased resistance of the latter thus diminishes the excitation current supplied by the exciter generator B to the field winding 24. The output of the generator A is at once diminished correspondingly, and the engine 20 being thus relieved of part of its load, is permtited to regain its normal or intended speed for this assumed load, the auxiliary generator C guarding, by an action reverse from that above-described, against an over-stepping of the intended speed of the engine 20.

The speed of the armature 38 of the generator C being thus restored to normal, its output voltage will likewise be promptly restored to its intended or normal value and in this manner substantially constant voltage is maintained upon the power circuit 47—48.

Should the speed of the engine 20 increase beyond its intended value, the apparatus and devices act in the reverse manner from that above-described, and cause an increase in the excitation current supplied by the exciter generator B to the field 24 of the main generator A. The output of the latter is thus increased and the increased load on the engine 20 thus restores the speed of the latter to its intended value.

At this point it may be noted that, aside from maintaining consistently the desired efficiency of operation of the engine 20, as above briefly outlined, a very important practical advantage is realized; if it be assumed that the load on the motors 12—13 and hence the load on the engine 20 be increased, due, for example, to the vehicle or train commencing the ascent of a grade, the first tendency of this increased load on the engine 20 would be and is to decrease its speed. If a substantial decrease in its speed is permitted to take place, a subsequent further opening of the throttle valve 22, to supply the engine 20 with more fuel and thus to increase its output to meet the increased demand, would find the engine in a condition where it can but slowly and inadequately "pick up" or respond to the increased supply of fuel thereto. Such a condition would give rise to a loss of power and a great decrease in efficiency at substantially the exact moment when maximum power output and high efficiency of the engine 20 are most desired, but through the transmission system and apparatus provided in this invention, such a condition is effectively precluded from arising, it being noted, as already hereinbefore described, that the speed of the engine 20 is automatically maintained at its intended value and the engine is thus maintained in readiness to respond quickly and promptly to an increased supply of fuel thereto.

But in order more effectively to bring about the above-described advantages, I have arranged to pre-condition the engine to respond even more promptly, in response to increased fuel supply to the demand made upon it for a greater power output. A movement of the throttle or handle 23 in a direction to further open the valve 22, and thus to increase the fuel supplied to the engine 20, will be seen to increase the value of the resistance 45 shunted about the resistance 40 which is in circuit with the field winding 39 of the auxiliary generator C. This action results in decreasing the excitation of the auxiliary generator C, and in a consequent decrease in the voltage of its output, thus imposing upon the generator C conditions analogous to a decrease in speed of the engine 20. The winding 37 of the solenoid 36—37 is thus weakened, the exciting current flowing to the field 29 of the exciter generator B is thus decreased, and the resultant decrease in exciting current supplied the field winding 24 of the main generator A causes such a reduction in the power output of the generator A, and hence such a reduction in the load upon the engine 20, that the latter is permitted promptly to increase its speed until the voltage of the generator C is restored to its normal or intended value. Thus, the speed of the engine 20 may effectively be not only prevented from descending so as to cause the engine to pick up with great difficulty, but also and on the other hand increased to another standard of speed appropriate for the engine 20 to respond promptly to the greater fuel input thereto, and to prevent conditions of inefficiency from arising. The further opening of the valve 22 may, where the current-controlling device 45—46 is in the form of a variable resistance, cause a further increase in the standard of speed to be maintained by the engine 20 to take place, and thus the desired or intended power output-speed characteristic of the engine with consequent maintenance of high efficiency of operation, may be dependably achieved.

It will thus be seen that there has been provided by this invention an apparatus and system in which the several objects of this invention, as well as many practical advantages, are successfully achieved. It will be seen that the apparatus is of highly efficient action thoroughly dependable, and moreover marked simplicity of construction and arrangement. In this latter connection, it may be noted that the various controlling devices may be made of relatively small capacity, and hence of the desired sensitiveness, and that furthermore the wide range of action of which the apparatus must be capable to meet the widely varying characteristics of the load may be successfully achieved with apparatus of such relatively small capacity. A distinct advantage results from the foregoing features in that a wide range of control of the main generator may be achieved without necessitating complications of its design through the inclusion therein of a differential field winding. It will furthermore be seen also that, even though the varying characteristics of the load may impose upon the apparatus and system widely varying conditions of operation, yet auxiliary translating devices intended to be supplied with energy at substantially constant voltage may be dependably operated. It will furthermore be seen that the apparatus and system is of a thoroughly practical nature throughout and well adapted to meet the conditions of hard practical use.

As many possible embodiments may be made of the above invention, and as many changes might be made in the embodiments above set forth, it is to be understood that all matter hereinbefore set forth or shown in the accompanying drawing, is to be interpreted as illustrative and not in a limiting sense.

I claim as my invention:

1. In apparatus of the character described, in combination, an internal combustion engine having a power output-speed characteristic such that a change in its power output is accompanied by a change in its speed, a load adapted to be supplied with energy from said engine, variable power transmission means interposed between said engine and said load, a source of variable voltage for controlling the energy transmitted by said power transmission means, means for controlling said source of voltage to maintain substantially constant the energy supplied said load at a given speed of said engine, and means for changing the standard of operation of said last-mentioned means to maintain substantial constancy of energy supplied said load at a different speed of said engine.

2. In apparatus of the character described, in combination, a vehicle carrying an internal combustion engine and a generator driven thereby, a motor for driving said vehicle and supplied with energy from said generator, an exciter for supplying excitation current to said generator, and means responsive to the speed of said engine operative upon an increase in the speed of the engine to increase the voltage of said exciter and upon a decrease in the speed of said engine to decrease the voltage of said exciter.

3. In apparatus of the character described, in combination, a vehicle carrying an internal combustion engine and a generator driven thereby, a motor for driving said vehicle and supplied with energy from said generator, an exciter generator for supplying excitation current to said generator, an auxiliary generator driven by said engine and having the characteristic that a function of its output will vary substantially in accordance with variations in its speed of drive, and means responsive to the said function of the output of said auxiliary generator for affecting the voltage of said exciter.

4. In apparatus of the character described, in combination, a vehicle carrying an internal combustion engine and a generator driven thereby, a motor for driving said vehicle and supplied with energy from said generator, an exciter generator for supplying excitation current to said generator, a variable resistance in the field circuit of said exciter, and means responsive to speed changes of said engine for controlling said variable resistance.

5. In apparatus of the character described, in combination, a vehicle carrying an internal combustion engine and a generator driven thereby, a motor for driving said vehicle and supplied with energy from said generator, an exciter generator for supplying excitation current to said generator, a variable resistance in the field circuit of said exciter, an auxiliary generator, means relating said auxiliary generator to said engine so that a function of its output will vary in accordance substantially with changes in the speed of said engine, and means responsive to the said function of the output of said auxiliary generator for controlling said variable resistance.

6. In apparatus of the character described, in combination, a vehicle carrying an internal combustion engine and a generator driven thereby, a motor for driving said vehicle and supplied with energy from said generator, an exciter for supplying excitation current to said generator, means effective upon a decrease in speed of said engine due to an increase in the load on said engine to decrease the voltage of said exciter and upon an increase in speed of said engine due to a decrease in the load on said engine to increase the voltage of said exciter, and means for changing the standard of operation of said last-mentioned means.

7. In apparatus of the character described, in combination, a vehicle carrying an internal combustion engine and a generator driven thereby, a motor for driving said vehicle and supplied with energy from said generator, a source of voltage for supplying excitation current to said generator, means responsive to speed changes of said engine for varying the voltage of said source, means for controlling the power output of said engine, and means responsive to the operation of said last-mentioned means for changing the standard of operation of said voltage-varying means.

8. In apparatus of the character described, in combination, a prime mover, a load driven therefrom, power transmission means interposed therebetween, a single source of variable voltage for controlling said power transmission means, and means responsive to changes in speed of said prime mover for controlling the voltage of said source.

9. In apparatus of the character described, in combination, a prime mover, a load driven therefrom, power transmission means interposed therebetween, a single source of variable voltage for controlling said power transmission means, an auxiliary generator, means relating said auxiliary generator to said prime mover so that a function of its output will vary substantially in accordance with a change in speed of said prime mover, and means responsive to the said function of the output of said auxiliary generator for controlling the voltage of said source.

10. In apparatus of the character described, in combination, a prime mover, a generator driven thereby, means forming a load supplied with energy from said generator, an exciter for supplying excitation current to said generator, means for controlling the voltage of said exciter, and means for operating said voltage-controlling means to maintain substantially constant the energy supplied to said load.

11. In apparatus of the character described, in combination, a prime mover, a generator driven thereby, means forming a load supplied with energy from said generator, an exciter for supplying excitation current to said generator, a variable resistance for controlling the voltage of the output of said exciter, an auxiliary generator, means relating said auxiliary generator to said prime mover so that a function of its output will vary substantially in accordance with changes in speed of said prime mover, and means responsive to the said function of the output of said auxiliary generator for controlling said resistance.

12. In apparatus of the character described, in combination, a prime mover, a generator driven thereby, means forming a load supplied with energy from said generator, an exciter for supplying excitation current to said generator, means for controlling the voltage of said exciter, means for operating said voltage-controlling means to maintain substantially constant the energy supplied said load and means for changing the standard of operation of said last-mentioned means.

13. In apparatus of the character described, in combination, a prime mover, a generator driven thereby, means forming a load supplied with energy from said generator, an exciter for supplying excitation current to said generator, means for controlling the voltage of said exciter, means for operating said voltage-controlling means to maintain substantially constant the energy supplied said load, means for controlling the power output of said prime mover, and means responsive to the operation of said last-mentioned means for changing the standard of operation of said operating means.

14. In apparatus of the character described, in combination, a prime mover, a generator driven thereby, means forming a load supplied with energy from said generator, an exciter for supplying excitation current to said generator, a translation circuit, an auxiliary generator driven by said prime mover and supplying energy to said translation circuit, and means for maintaining the voltage of the output of said auxiliary generator substantially constant comprising means responsive to changes in voltage thereof for affecting the excitation supplied to said first-mentioned generator.

15. In apparatus of the character described, in combination, a prime mover and a load driven therefrom, a translation circuit, a generator driven by said prime mover and connected to supply energy to said translation circuit, and means for maintaining constant a function of the output of said generator comprising means responsive to a change in the said function and for affecting the load on said prime mover.

16. In apparatus of the character described, in combination, a prime mover, a load driven therefrom, power transmission means interposed therebetween, a translation circuit, a generator driven by said prime mover and connected to supply energy to said translation circuit, and means for maintaining substantially constant a function of the output of said generator including means responsive to changes in the said function for affecting the effectiveness of said power transmission means.

17. In apparatus of the character described, in combination, an internal combustion engine, a generator driven thereby, means forming a load supplied with energy from said generator, a translation circuit, an auxiliary generator driven by said engine for supplying energy to said translation circuit, and means responsive to changes in voltage of said auxiliary generator for controlling the output of said first-mentioned generator.

18. In apparatus of the character described, in combination, an internal combustion engine, a generator adapted to be driven thereby and to supply a load, a translation circuit, an auxiliary generator driven by said engine for supplying energy to said translation circuit, means responsive to changes in voltage of said auxiliary generator for controlling the output of said first-mentioned generator, and means for changing the standard of operation of said auxiliary generator.

19. In apparatus of the character described, in combination, a vehicle carrying a prime mover, transmission means interposed between said prime mover and a wheel of said vehicle, a translation circuit, a generator driven by said prime mover for supplying energy to said translation circuit, and means for maintaining substantially constant a function of the output of said generator including means responsive to changes in the said function of the output of said generator for controlling the effectiveness of said transmission means.

20. In apparatus of the character described, in combination, a vehicle carrying a prime mover, transmission means interposed between said prime mover and a wheel of said vehicle, a translation circuit, a generator driven by said prime mover for supplying energy to said translation circuit, means responsive to an increase in the speed of said generator for increasing the effectiveness of said transmission means and responsive to a decrease in the speed of said generator for decreasing the effectiveness of said transmission means, and means for changing the standard of operation of said last-mentioned means.

In testimony whereof, I have signed my name to this specification this thirteenth day of April, nineteen hundred and twenty-five.

ALAN VARLEY LIVINGSTON.